Figure 4:
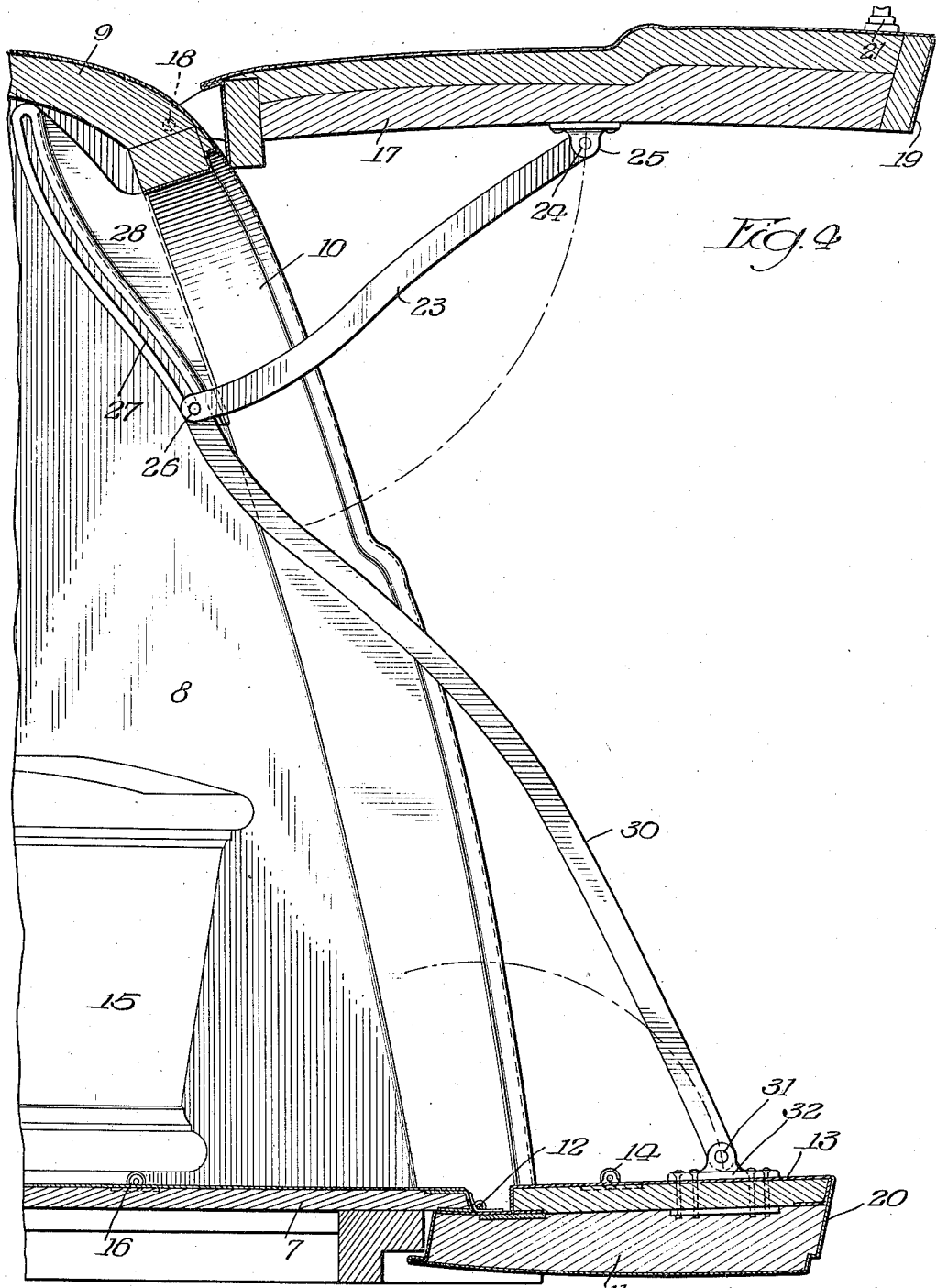

Dec. 14, 1937.  J. F. BURKEY  2,102,110
VEHICLE BODY
Filed June 10, 1935  2 Sheets-Sheet 1
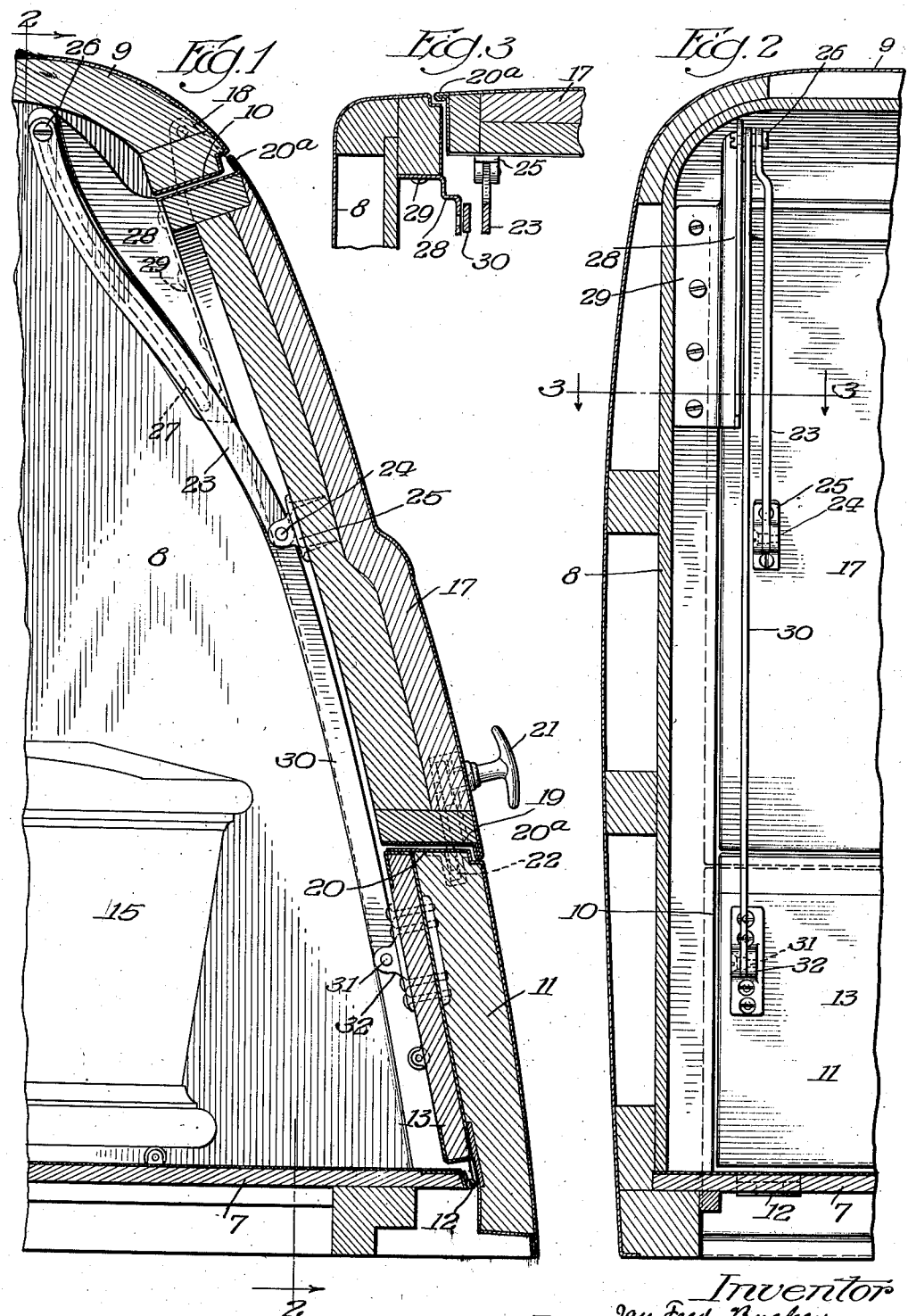
Inventor
Jay Fred Burkey
By Fred Gerlach his Atty.

Patented Dec. 14, 1937

2,102,110

UNITED STATES PATENT OFFICE 2,102,110

VEHICLE BODY

Jay Fred Burkey, Auburn, Ind., assignor to Auburn Automobile Company, Auburn, Ind., a corporation of Indiana Application June 10, 1935, Serial No. 25,704

2 Claims. (Cl. 296—106)

The invention relates to vehicle bodies and more particularly to closures for facilitating the loading and unloading, through an opening in the body, of caskets or boxes for the transportation of which the vehicle is used.

One object of the invention is to provide a vehicle body with an improved door-closure, which is applicable to closed bodies used for the transportation of caskets or the like, and comprises a lower door or member adapted to swing vertically and outwardly into and be retained in, substantial alignment with the floor of the body to serve as an extended or outside support in loading and unloading the casket.

Another object of the invention is to provide a vehicle body with a closure which comprises such a lower door or member and an upper vertically swinging door or member operatively connected to shift the lower member into and out of closed position.

Other objects of the invention will appear from the detailed description.

The invention consists in the several novel features which are hereinafter set forth and are more particularly defined by claims at the conclusion hereof.

In the drawings: Fig. 1 is a vertical longitudinal section of the rear portion of a closed vehicle body embodying the invention, the closure being shown in closed position. Fig. 2 is a vertical transverse section on line 2—2 of Fig. 1, looking toward the door-closure. Fig. 3 is a section on line 3—3 of Fig. 1. Fig. 4 is a section similar to Fig. 1, illustrating the closure in its open position.

The invention is illustrated as applied to the rear end of a vehicle body which comprises a floor 7; side walls 8; a roof 9; and an opening 10 in the back thereof extending substantially between the floor and the roof and between the sides of the body to provide a large opening for convenient loading and unloading of the body.

The movable closure for the opening 10 comprises a lower door or member 11 and an upper door or member 17. The lower member 11 extends across the lower portion of the opening and is hinged, as at 12, to swing vertically and downwardly or outwardly from its closed position, so that its front face 13 will be substantially aligned horizontally or coplanar with the floor 7 when member 11 is in its lowermost position, as shown in Fig. 4. Rollers 14 are mounted to project from the face 13 of the lower door section 11, so that a casket 15, or the like, may be easily moved thereover and onto rollers 16 on the floor 7 of the body, while withdrawing the casket from, or moving it into the body through the back opening while the section 11 is in its lowered position. The upper door or member 17 is horizontally hinged at 18 at its upper end to a fixed portion of the body adjacent the roof to permit said member to swing upwardly and rearwardly or outwardly from its closed position into an elevated horizontal position to clear the opening 10, as shown in Fig. 4. The lower edge 19 of the upper door or member 17 is arranged, to substantially meet the upper edge 20 of the lower door when the doors are closed, as shown in Fig. 1. A marginal projecting flange 20ª is provided on door 17 to lap the upper margin of the lower door and the contiguous portions of the opening 10.

The upper door 17 is provided with a handle 21 on its outside and adjacent its lower margin, which is adapted to operate a suitable latch or lock 22 of any suitable construction to securely lock the doors together when they are closed.

Suitable mechanism for simultaneously and conjointly shifting the upper and lower doors or members 11, 17 between their open and closed positions, is provided, preferably adjacent each side of the body. These mechanisms are alike in construction and one is illustrated. Each of these mechanisms comprises a link 23 which has its lower end pivoted at 24 to a bracket 25 fixed to the inner face of the upper door 17, and extends upwardly and forwardly to a point adjacent the roof 9 of the body; a pivot-pin 26 which is mounted in and movable with the upper end of link 23; a plate 28 which has a laterally extending integral flange 29 which is fixed to one of the rear corner posts of the body and is provided with a slot 27 through which pin 26 extends and whereby it is guided when link 23 is shifted by door 17; and an upwardly extending link 30, which has its lower end pivotally connected at 31 to a bracket 32 fixed to and projecting from the face 13 of the lower door 11 and its upper end pivoted to the pin 26 which is carried by the upper link 23. Link 23 is movable into position to serve as a strut for holding the door 17 in raised position when the pivot-pin 26 is seated in the lower end of slot 27 in plate 28. Link 30 serves as a brace to support the lower door 11 in its lowered position when the pin 26, to which the upper end of link 30 is connected, is seated in the lower end of slot 27 in plate 28.

The upper and lower doors, when closed, are held closed by the lock 22, as shown in Fig. 1. When in this position, the upper end of link 30, which is carried by the upper door 17, is adjacent the upper end of the slot 27 and upper end of link 20 is similarly positioned. To open the doors to clear the opening 10 for the removal of the load, the lock controlled by the handle 21 is turned to withdraw the bolt of lock 22 from the recess in the lower door-section 11, and lifted to swing the upper door-section 17 upwardly into raised horizontal position, until it reaches the position shown in Fig. 4. This lifting of the upper door 17 will move link 20 and the pivot-pin 26 downwardly and rearwardly in the slot 27. This movement of the pin 26 will move link 30 downwardly until it reaches the position shown in Fig. 4. When pin 26 reaches the lower end of slot 27, link 30 will be stopped and the lower door 13 will be supported in its horizontal position, so that it will constitute a support rearwardly or outwardly of the body during the withdrawal of the casket 15. The latter can be conveniently unloaded by rolling it rearwardly over the lower door 11 whereby the casket will be supported and readily accessible for removal. When the casket is to be loaded into the body it can be readily pushed over the lower door 11 into the body of the vehicle and the door 11 will serve as a support for the casket while the latter is being pushed into the body of the vehicle. After the vehicle is loaded, the operator, to close the doors, will push the link 20 upwardly or lift the outer end of the lower door 11, so that pin 26 will ride upwardly in slot 27 and release or unlock link 23 which supports the upper door while it is raised. This operation will be continued until links 23 and 30 move into position shown in Fig. 1 and both the upper and lower doors are closed.

Only one raising and lowering mechanism has been illustrated and described, but it will be understood that, in practice, a duplicate is preferably provided at each side of the vehicle body to cause both ends of the doors, when open, to be supported and to be evenly operated.

A characteristic of the construction described is that the links for the upper and lower doors are pivoted together to swing on a common axis. As a result of this, the forces for conjointly swinging the doors are directly transmitted from one link to the other so that the mechanism will operate freely. Another characteristic of the construction described is that when the doors are open the lower link 30 acts as a suspension link for supporting the lower door because it is positively arrested by the lower end of the slot 27 in the guide 28 and the link is connected to the lower door a substantial distance from the pivot 12. The supporting stresses for the upper door are transmitted through the upper link to the stop on the guide independently of the lower link. This avoids prying stresses on the hinges 12. When the doors are open the upper link acts as a strut or thrust member between the fixed guide and the upper door while the lower link acts as an oblique suspension member between the guide and the lower door. Another characteristic of the invention is that the link for the lower door is pivoted to and in close proximity to the inner face of the lower door and when the doors are closed the major portion of link 30 extends substantially parallel and in close proximity to the inner face of the door. This makes it possible to place the operating mechanism where it will not interfere with the load in the body of the vehicle.

The invention exemplifies a closed type of vehicle-body with an opening for loading and unloading purposes, which extends substantially throughout the entire area of the back of the body, with a closure composed of members or doors provided to swing vertically on pivots adjacent the top and bottom of the body to clear substantially the entire area of the opening for convenience in loading and unloading and in which the lower door will be swung into position substantially aligned horizontally with the floor of the body to provide a support outside of the body for convenience in handling the load. Also, a vehicle body with doors of the aforesaid character with operating mechanism for simultaneously and conjointly shifting the doors between their open and closed positions and whereby the doors are automatically supported and secured in their open position.

The invention is particularly advantageous in connection with vehicles used for the transportation of caskets and the like, because the lower vertically swinging door-section, when open, is secured in position to serve as a support rearwardly of the body of the vehicle for the casket in loading it into and unloading it from the vehicle body.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a vehicle body, the combination of a body comprising a floor and provided with an opening for loading and unloading purposes, a closure for said opening comprising a lower door pivoted at its lower end to the body to swing vertically from its closed position outwardly of the body and into substantially horizontal alignment with the floor and an upper door pivoted at its upper end to the body to swing vertically and outwardly from the body, and an operative connection between the doors comprising a pair of links respectively pivoted to the doors, a pivotal connection between the links which permits them to swing on a common axis, and a fixed guide for slidably controlling and for arresting the pivotal connection so that the links will conjointly shift the doors and for arresting the pivotal connection at a point where the links will be automatically supported through the pivotal connection and the guide to secure and support the doors in their open and substantially horizontal position the link for the upper door being positioned, when the upper door is open, obliquely and acting as an oblique strut between the fixed guide and the upper door, the lower link being oblique, and acting as a suspension member between the guide and the lower door, when the lower door is open.

2. In a vertical body, the combination of a body comprising a floor and provided with an opening for loading and unloading purposes, a closure for said opening comprising a lower door pivoted at its lower end to the body to swing vertically from its closed position outwardly of the body and into substantially horizontal alignment with the floor and an upper door pivoted at its upper end to the body to swing vertically and outwardly from the body, and an operative connection between the doors comprising links respectively pivoted to the doors, a pivot pin extending through both of the links, and a fixed guide-plate having a slot for slidably guiding the pin and whereby it will be guided to control the pivotal movements of the links so they will conjointly shift the doors, the slot terminating so that the pin will be arrested by the guide-plate at a point where the links will be automatically supported to secure the doors in their open and substantially horizontal position the link for the upper door being positioned, when the upper door is open, obliquely and acting as an oblique strut between the fixed guide and the upper door, the lower link being oblique, and acting as a suspension member between the guide and the lower door, when the lower door is open.

JAY FRED BURKEY.